United States Patent
Manolakos et al.

(10) Patent No.: US 11,916,836 B2
(45) Date of Patent: Feb. 27, 2024

(54) INTERACTION OF DISCONTINUOUS RECEPTION (DRX) WITH POSITIONING REFERENCE SIGNAL (PRS) RESOURCES

(71) Applicant: QUALCOMM Incorporated, San Diego, CA (US)

(72) Inventors: Alexandros Manolakos, Escondido, CA (US); Sony Akkarakaran, Poway, CA (US); Guttorm Opshaug, Redwood City, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/063,547

(22) Filed: Dec. 8, 2022

(65) Prior Publication Data

US 2023/0103460 A1    Apr. 6, 2023

Related U.S. Application Data

(62) Division of application No. 16/795,399, filed on Feb. 19, 2020, now Pat. No. 11,558,162.

(30) Foreign Application Priority Data

Aug. 12, 2019  (GR) .............................. 20190100348

(51) Int. Cl.
*H04L 5/00* (2006.01)
*H04W 52/02* (2009.01)
(Continued)

(52) U.S. Cl.
CPC ....... *H04L 5/0051* (2013.01); *H04W 52/0216* (2013.01); *H04W 72/0446* (2013.01); *H04W 72/51* (2023.01)

(58) Field of Classification Search
CPC ..... H04L 5/0051; H04L 5/0007; H04L 5/001; H04L 5/0055; H04L 5/0057;
(Continued)

(56) References Cited

U.S. PATENT DOCUMENTS

| 2010/0273506 | A1 | 10/2010 | Stern-Berkowitz et al. |
| 2012/0264449 | A1 | 10/2012 | Kazmi et al. |

(Continued)

FOREIGN PATENT DOCUMENTS

| CN | 102461015 A | 5/2012 |
| CN | 102461292 A | 5/2012 |

(Continued)

OTHER PUBLICATIONS

International Preliminary Report on Patentability—PCT/US2020/034718, The International Bureau of WIPO—Geneva, Switzerland, dated Mar. 10, 2022.

(Continued)

*Primary Examiner* — Thai Nguyen
(74) *Attorney, Agent, or Firm* — Thien T. Nguyen

(57) ABSTRACT

Disclosed are techniques for wireless communication. In an aspect, a user equipment (UE) operating in discontinuous reception (DRX) mode receives a DRX configuration, receives a reference signal resource configuration, determines, at least based on the DRX configuration and the reference signal resource configuration, whether an overlap exists between a reference signal occasion of a plurality of reference signal occasions of the reference signal resource configuration and an active time of the DRX configuration, receives or transmits at least based on a determined overlap, at least a first reference signal in the reference signal occasion, and receives or transmits, while remaining in an active state of the DRX configuration, at least based on the determined overlap, at least a second reference signal in
(Continued)

remaining reference signal occasions of the plurality of reference signal occasions after expiration of the active time.

20 Claims, 17 Drawing Sheets

(51) Int. Cl.
*H04W 72/0446* (2023.01)
*H04W 72/51* (2023.01)

(58) Field of Classification Search
CPC ..... H04L 5/0048; H04L 5/005; H04L 5/0053; H04L 5/0078; H04W 52/0216; H04W 72/0446; H04W 72/51; H04W 76/28; H04W 64/00; H04W 88/02; H04W 72/23; H04W 76/15; Y02D 30/70
See application file for complete search history.

(56) References Cited

U.S. PATENT DOCUMENTS

| | | | |
|---|---|---|---|
| 2014/0094188 A1* | 4/2014 | Kazmi | H04W 4/023 455/456.1 |
| 2015/0230112 A1 | 8/2015 | Siomina et al. | |
| 2016/0081111 A1 | 3/2016 | Yi et al. | |
| 2017/0134904 A1* | 5/2017 | Fischer | H04W 64/00 |
| 2019/0182794 A1 | 6/2019 | Wong et al. | |
| 2019/0254110 A1 | 8/2019 | He et al. | |
| 2020/0145918 A1 | 5/2020 | Ji et al. | |
| 2020/0214082 A1 | 7/2020 | Luo et al. | |
| 2020/0413460 A1 | 12/2020 | Tang et al. | |
| 2021/0050978 A1 | 2/2021 | Manolakos et al. | |

FOREIGN PATENT DOCUMENTS

| | | | | |
|---|---|---|---|---|
| WO | 2012112104 A1 | 8/2012 | | |
| WO | 2014025302 A1 | 2/2014 | | |
| WO | WO-2020229567 A1 * | 11/2020 | ........... | H04L 5/0051 |

OTHER PUBLICATIONS

International Search Report and Written Opinion—PCT/US2020/034718—ISA/EPO—dated Sep. 11, 2020.
Taiwan Search Report—TW109117732—TIPO—dated Oct. 9, 2023.

* cited by examiner

INTERACTION OF DISCONTINUOUS RECEPTION (DRX) WITH POSITIONING REFERENCE SIGNAL (PRS) RESOURCES

CROSS-REFERENCE TO RELATED APPLICATION

The present Application for Patent is a Divisional Application of U.S. application Ser. No. 16/795,399, filed Feb. 19, 2020, which claims priority under 35 U.S.C. § 119 to Greek Patent Application No. 20190100348, entitled "INTERACTION OF DISCONTINUOUS RECEPTION (DRX) WITH POSITIONING REFERENCE SIGNAL (PRS) RESOURCES," filed Aug. 12, 2019, assigned to the assignee hereof, and each of which is incorporated herein by reference in its entirety.

INTRODUCTION

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) operating in a discontinuous reception (DRX) mode includes receiving a DRX configuration from a serving cell, receiving at least one reference signal resource configuration for receiving or transmitting reference signals from or to a transmission-reception point (TRP), determining, at least based on the DRX configuration and the at least one reference signal resource configuration, whether an overlap exists between at least one reference signal occasion of a plurality of reference signal occasions of the at least one reference signal resource configuration and an active time of the DRX configuration, wherein the plurality of reference signal occasions comprises a plurality of consecutive slots in which the at least one reference signal resource configuration is scheduled, and receiving or transmitting, from or to the TRP, at least based on a determined overlap, at least a first reference signal in the at least one reference signal occasion.

In an aspect, a method of wireless communication performed by a location server includes receiving, from a UE operating in a DRX mode or a base station serving the UE, a configuration of the DRX mode, and transmitting, to a second base station, a positioning reference signal (PRS) configuration to use for transmission of PRS to the UE.

In an aspect, a UE operating in a DRX mode includes a memory, at least one transceiver, and at least one processor communicatively coupled to the memory and the at least one processor, the at least one processor configured to: receive, via the at least one transceiver, a DRX configuration from a serving cell, receive, via the at least one transceiver, at least one reference signal resource configuration for receiving or transmitting reference signals from or to a TRP, determine, at least based on the DRX configuration and the at least one reference signal resource configuration, whether an overlap exists between at least one reference signal occasion of a plurality of reference signal occasions of the at least one reference signal resource configuration and an active time of the DRX configuration, wherein the plurality of reference signal occasions comprises a plurality of consecutive slots in which the at least one reference signal resource configuration is scheduled, and receive or transmit, from or to the TRP via the at least one transceiver, at least based on a determined overlap, at least a first reference signal in the at least one reference signal occasion.

In an aspect, a location server includes a memory, at least one network interface, and at least one processor communicatively coupled to the memory and the at least one network interface, the at least one processor configured to receive, via the at least one network interface, from a UE operating in a DRX mode or a base station serving the UE, a configuration of the DRX mode, and cause the at least one network interface to transmit, to a second base station, a PRS configuration to use for transmission of PRS to the UE.

In an aspect, a UE operating in a DRX mode includes means for receiving a DRX configuration from a serving cell, means for receiving at least one reference signal resource configuration for receiving or transmitting reference signals from or to a TRP, means for determining, at least based on the DRX configuration and the at least one reference signal resource configuration, whether an overlap exists between at least one reference signal occasion of a plurality of reference signal occasions of the at least one reference signal resource configuration and an active time of the DRX configuration, wherein the plurality of reference signal occasions comprises a plurality of consecutive slots in which the at least one reference signal resource configuration is scheduled, and means for receiving or transmitting, from or to the TRP, at least based on a determined overlap, at least a first reference signal in the at least one reference signal occasion.

In an aspect, a location server includes means for receiving, from a UE operating in a DRX mode or a base station serving the UE, a configuration of the DRX mode, and means for transmitting, to a second base station, a PRS configuration to use for transmission of PRS to the UE.

In an aspect, a non-transitory computer-readable medium storing computer-executable instructions includes a computer-executable instructions comprising at least one instruction instructing a UE operating in a DRX mode to receive a DRX configuration from a serving cell, at least one instruction instructing the UE to receive at least one reference signal resource configuration for receiving or transmitting reference signals from or to a TRP, at least one instruction instructing the UE to determine, at least based on the DRX configuration and the at least one reference signal resource configuration, whether an overlap exists between at least one reference signal occasion of a plurality of reference signal occasions of the at least one reference signal resource configuration and an active time of the DRX configuration, wherein the plurality of reference signal occasions comprises a plurality of consecutive slots in which the at least one reference signal resource configuration is scheduled, and at least one instruction instructing the UE to receive or transmit, from or to the TRP, at least based on a determined overlap, at least a first reference signal in the at least one reference signal occasion.

In an aspect, a non-transitory computer-readable medium storing computer-executable instructions includes computer-executable instructions comprising at least one instruction instructing a location server to receive, from a UE operating in a DRX mode or a base station serving the UE, a configuration of the DRX mode, and at least one instruction instructing the location server to transmit, to a second base station, a PRS configuration to use for transmission of PRS to the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
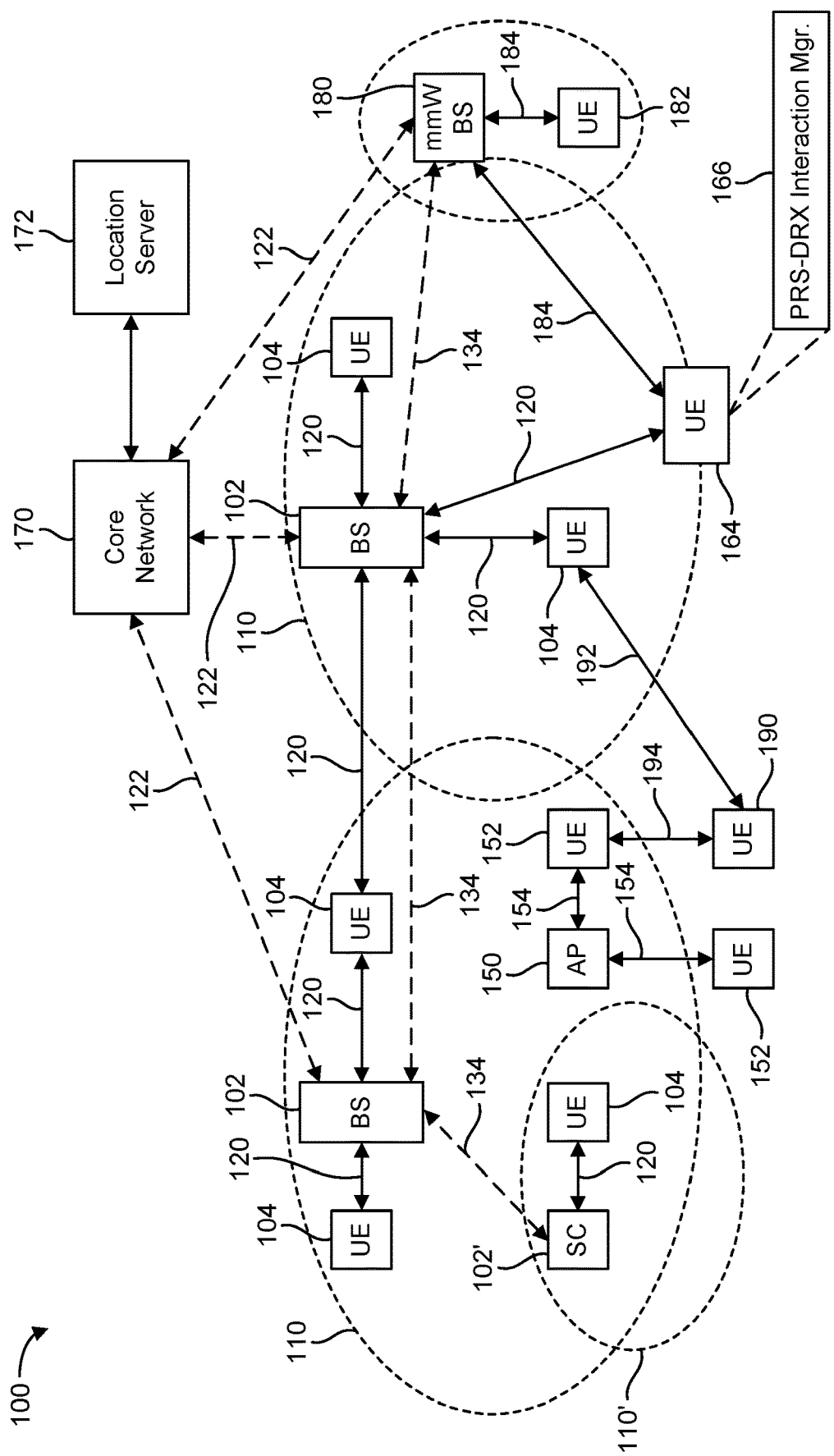
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a PRS-DRX interaction manager 166 that may enable the UE 164 to perform the UE operations described herein. Note that although only one UE in FIG. 1 is illustrated as having a PRS-DRX interaction manager 166, any of the UEs in FIG. 1 may be configured to perform the UE operations described herein.

Figure 2A:
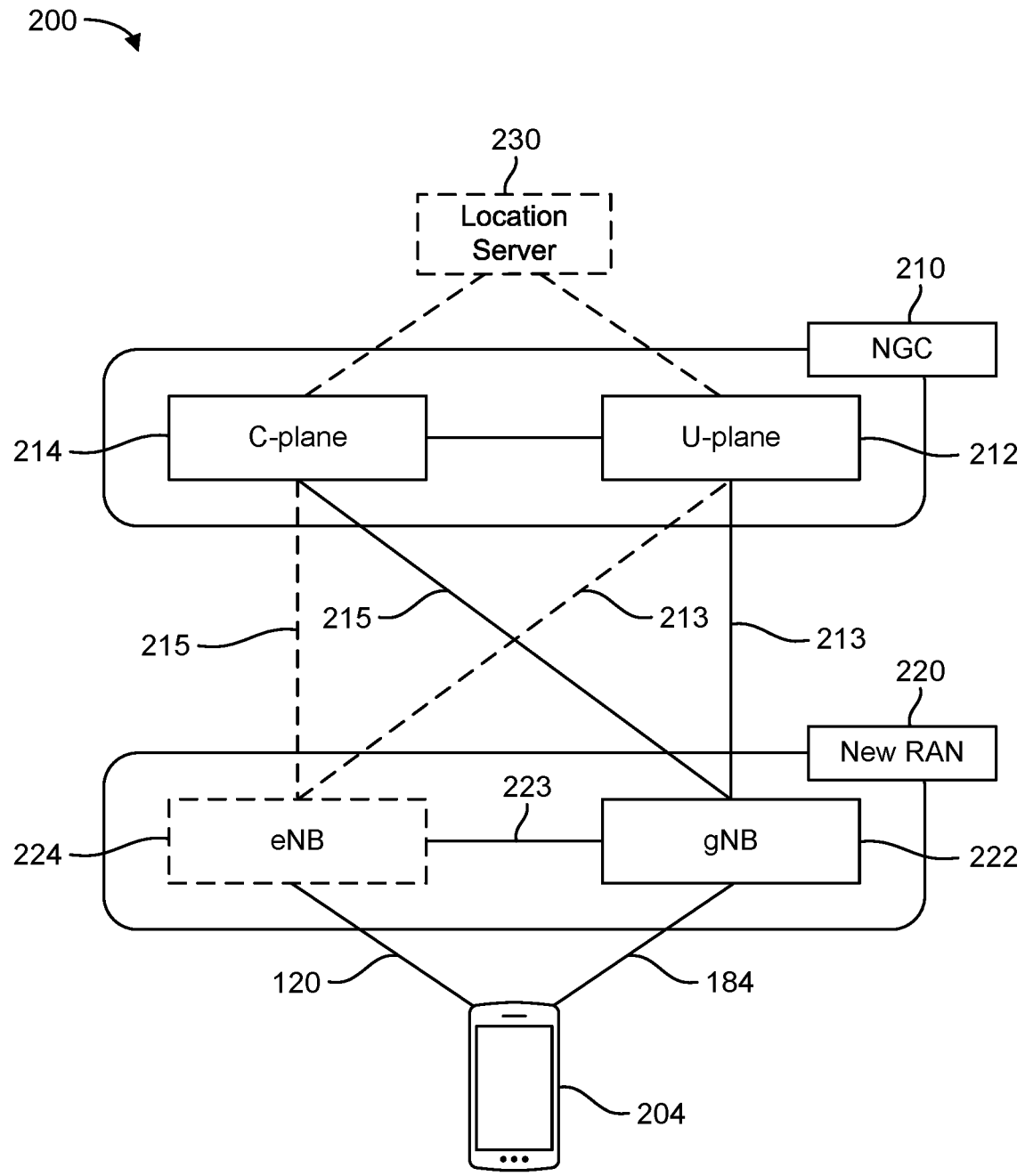
FIGS. 2A and 2B illustrate example wireless network structures, according to various aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230 (which may correspond to location server 172), which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
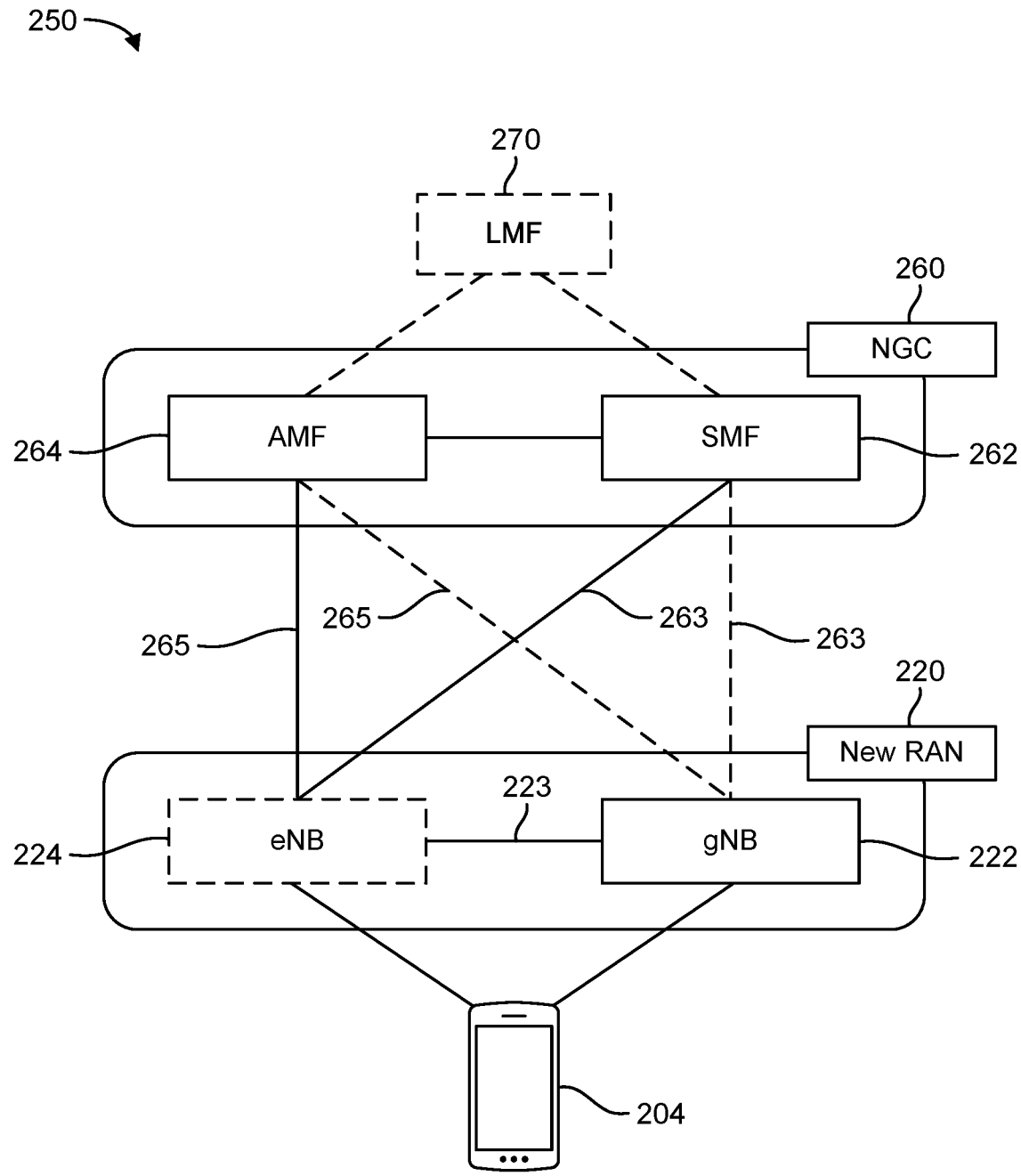

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
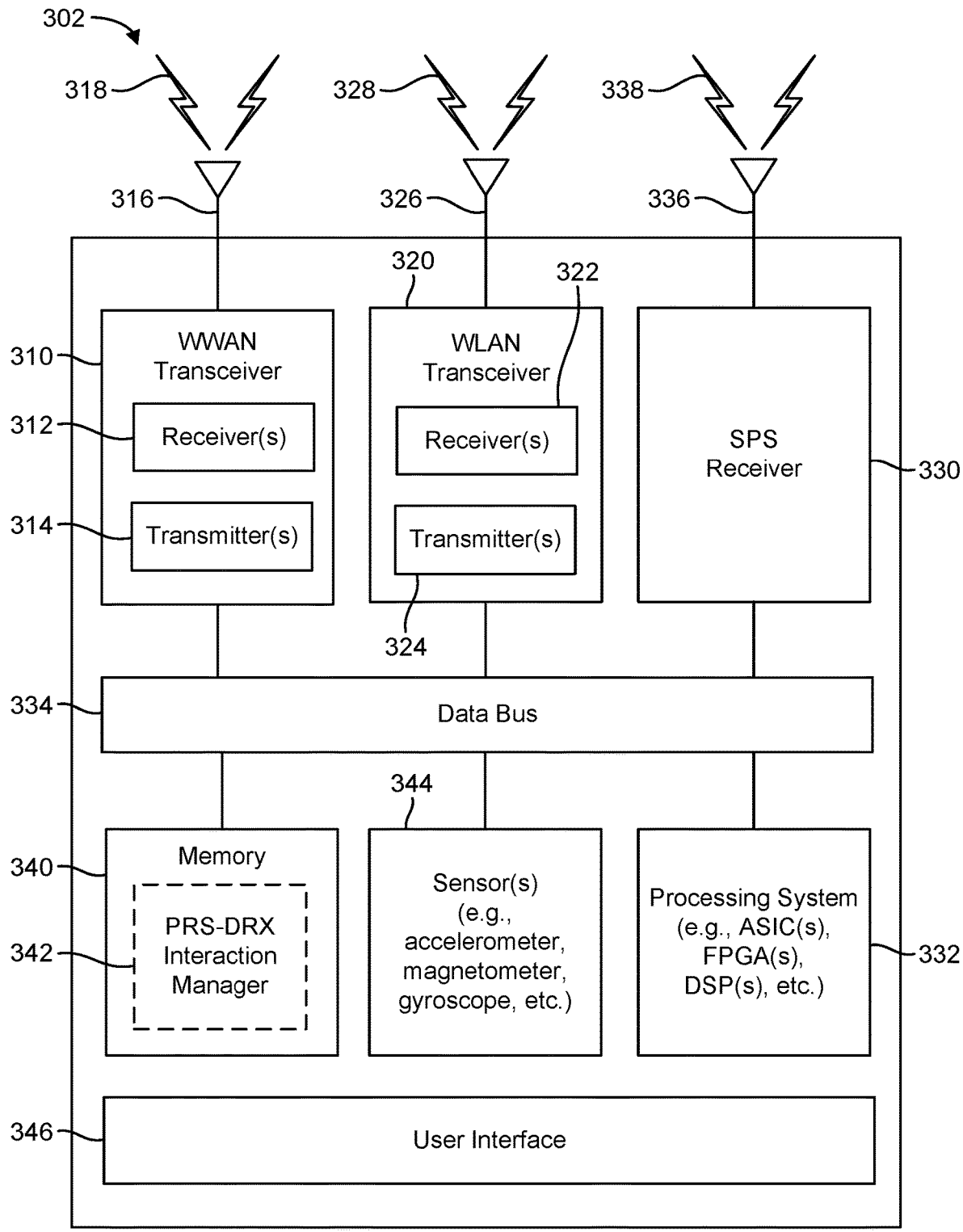
FIGS. 3A to 3C are simplified block diagrams of several sample aspects of components that may be employed in wireless communication nodes and configured to support communication as taught herein.
Figure 3B:
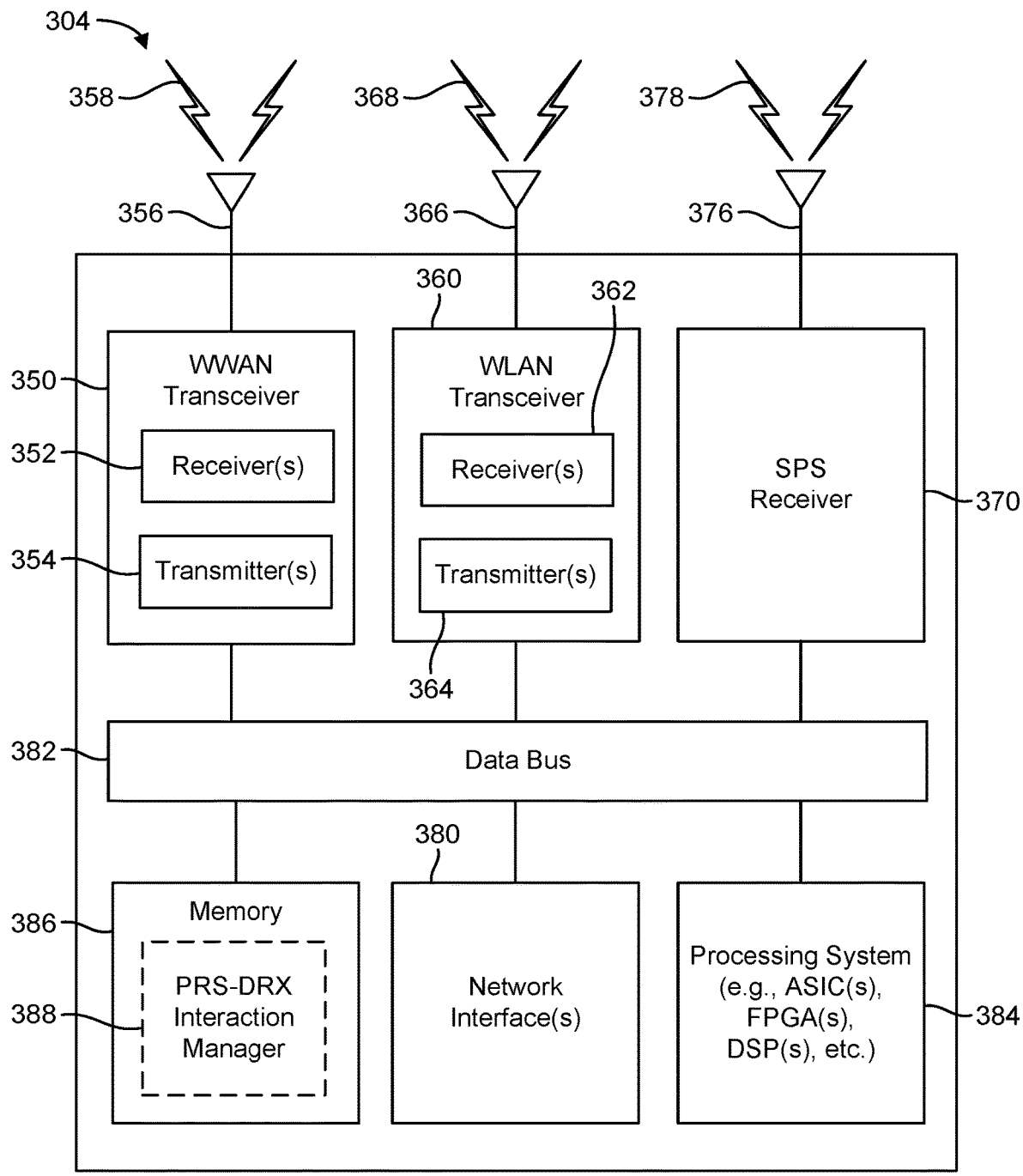
Figure 3C:
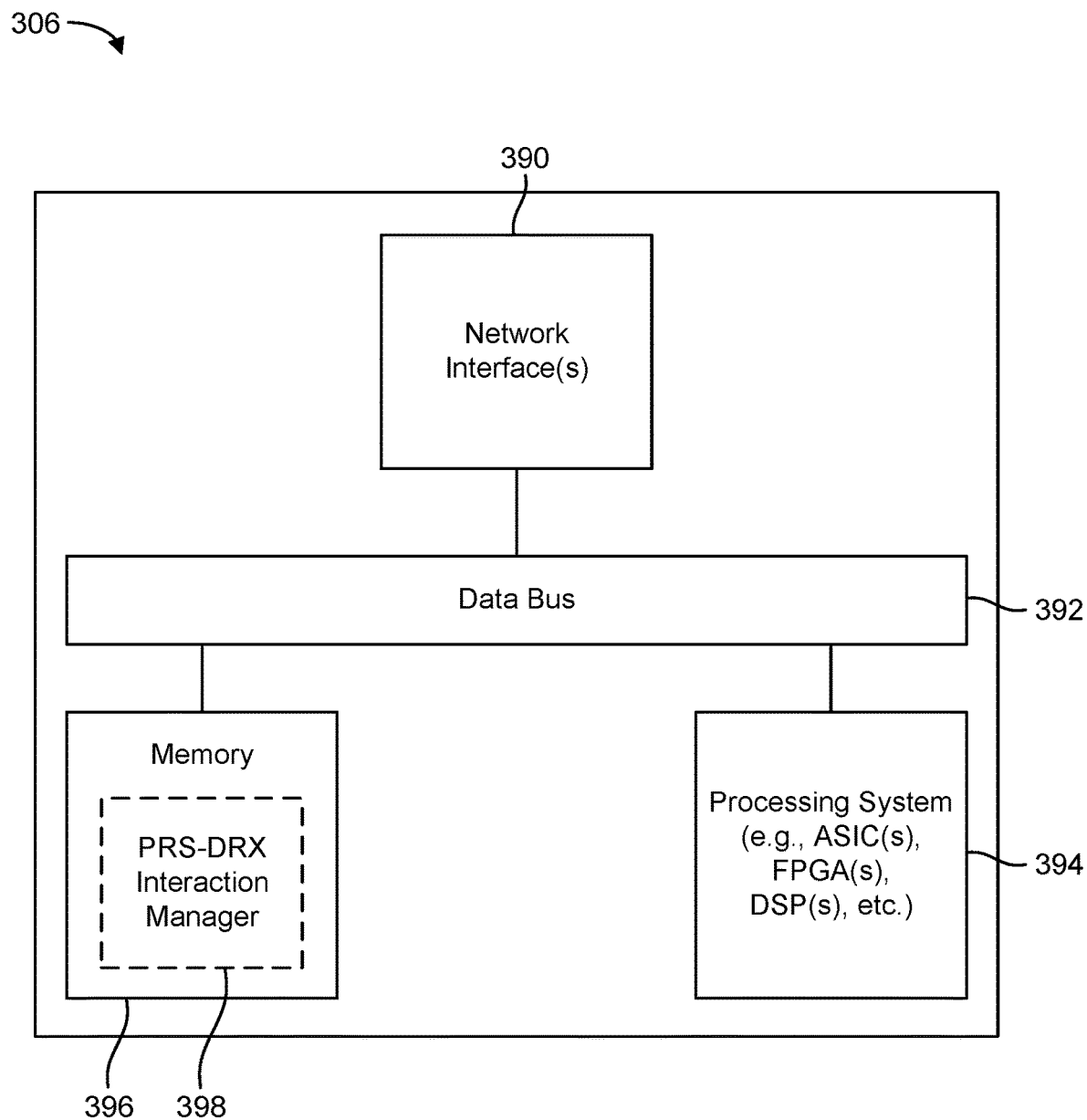

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, PRS and DRX interaction as disclosed herein and for providing other processing functionality. The base station 304 includes a processing system 384 for providing functionality relating to, for example, PRS and DRX interaction as disclosed herein and for providing other processing functionality. The network entity 306 includes a processing system 394 for providing functionality relating to, for example, PRS and DRX interaction as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include PRS-DRX interaction managers 342, 388, and 398, respectively. The PRS-DRX interaction managers 342, 388, and 398 may be hardware circuits that are part of or coupled to the processing systems 332, 384, and 394, respectively, that, when executed, cause the apparatuses 302, 304, and 306 to perform the functionality described herein. In other aspects, the PRS-DRX interaction managers 342, 388, and 398 may be external to the processing systems 332, 384, and 394 (e.g., part of a modem processing system, integrated with another processing system, etc.). Alternatively, the PRS-DRX interaction managers 342, 388, and 398 may be memory modules (as shown in FIGS. 3A-C) stored in the memory components 340, 386, and 396, respectively, that, when executed by the processing systems 332, 384, and 394 (e.g., or a modem processing system, another processing system, etc.), cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the PRS-DRX interaction managers 342, 388, and 398, etc.

Figure 4A:
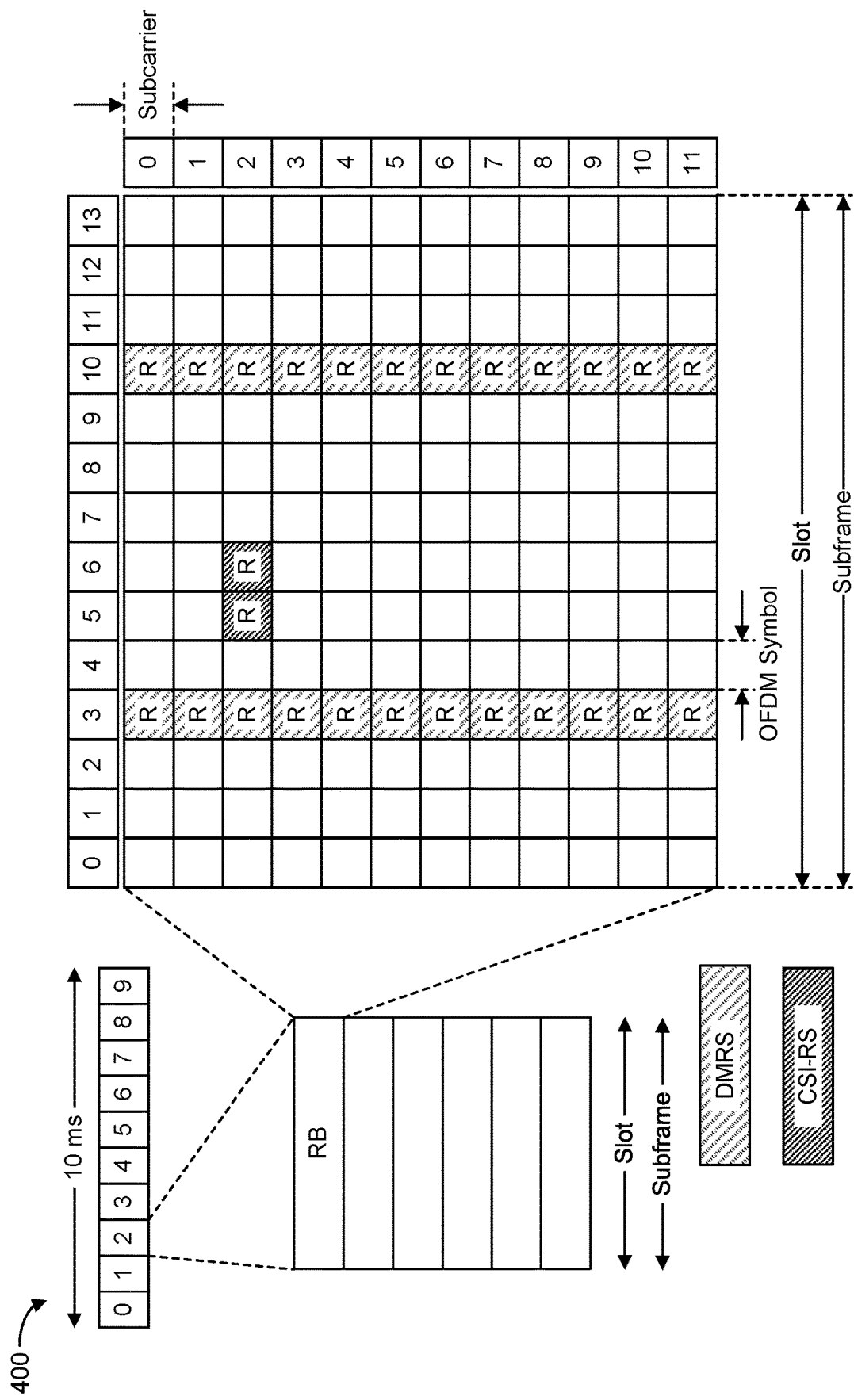
FIGS. 4A and 4B are diagrams illustrating examples of frame structures and channels within the frame structures, according to aspects of the disclosure.

Time intervals of a communications resource in LTE or 5G NR may be organized according to radio frames. FIG. 4A is a diagram 400 illustrating an example of a DL frame structure, according to aspects of the disclosure. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 240 kHz or greater may be available. Table 1 provided below lists some various parameters for different NR numerologies.

TABLE 1

| Sub-carrier spacing (kHz) | Symbols/ slot | slots/ subframe | slots/ frame | slot duration (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

Figure 4B:
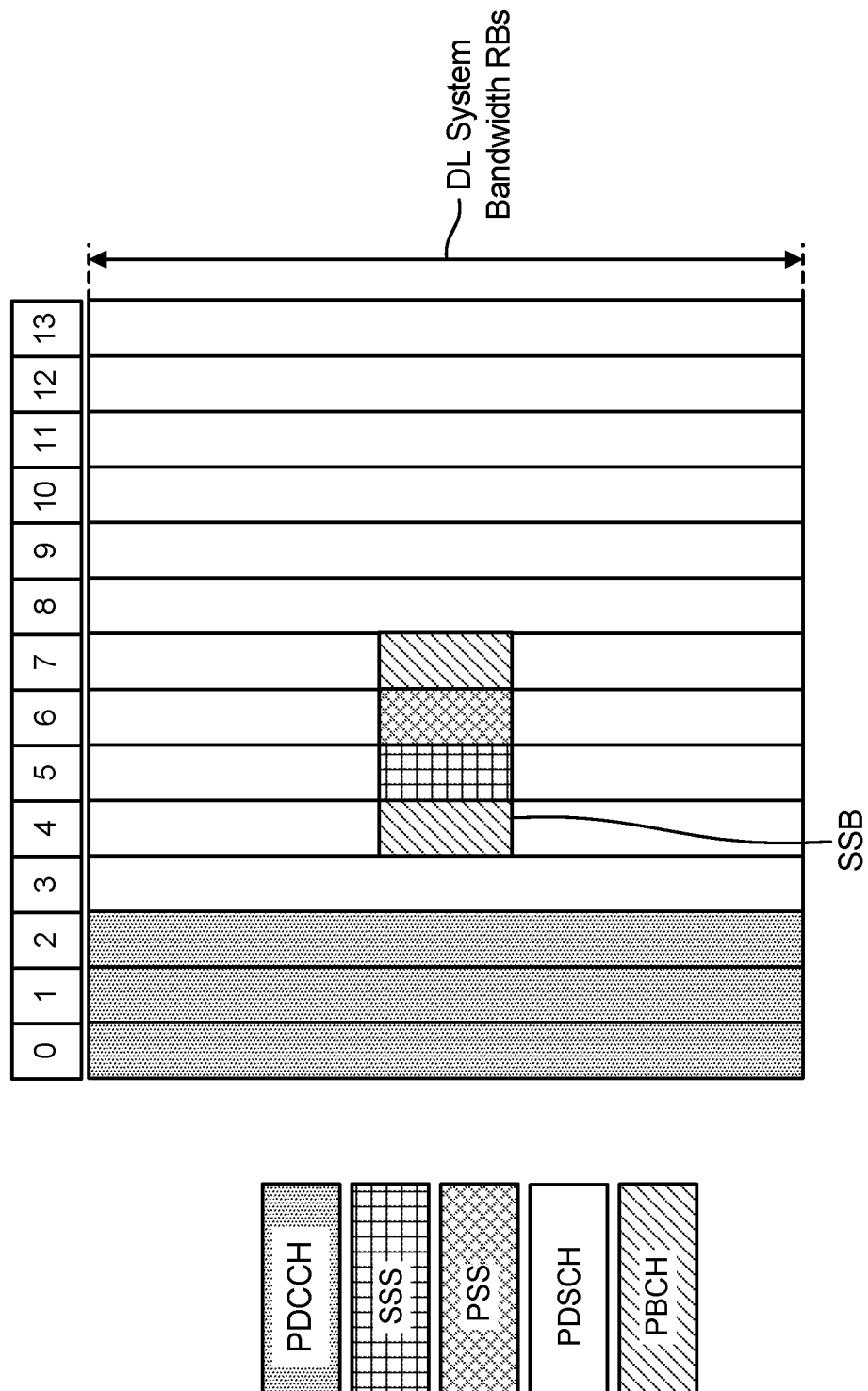

In the examples of FIGS. 4A and 4B, a numerology of 15 kHz is used. Thus, in the time domain, a frame (e.g., 10 milliseconds (ms)) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB. The MIB provides a number of RBs in the DL system bandwidth and a system frame number (SFN). The physical downlink shared channel (PDSCH) carries user data, broadcast system information not transmitted through the PBCH such as SIBs, and paging messages.

In some cases, the CSI-RS illustrated in FIG. 4A may be positioning reference signals (PRS). A collection of resource elements that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance."

A base station may transmit radio frames (e.g., radio frames 410), or other physical layer signaling sequences, supporting PRS according to frame configurations either similar to, or the same as that, shown in FIG. 4A (where the CSI-RS are PRS), which may be measured and used for a UE (e.g., any of the UEs described herein) position estimation. Other types of wireless nodes (e.g., a DAS, RRH, UE, AP, etc.) in a wireless communications network may also be configured to transmit PRS configured in a manner similar to (or the same as) that depicted in FIG. 4A.

PRS may be transmitted in special positioning subframes that are grouped into positioning occasions (or PRS occasions). As noted above, a PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or slots. As an example, $N_{PRS}$ may equal 4 and $T_{PRS}$ may be greater than or equal to 20. In some aspects, $T_{PRS}$ may be measured in terms of the number of slots between the start of consecutive positioning occasions. Multiple PRS occasions may be associated with the same PRS resource configuration, in which case, each such occasion is referred to as an "occasion of the PRS resource" or the like.

Figure 4C:
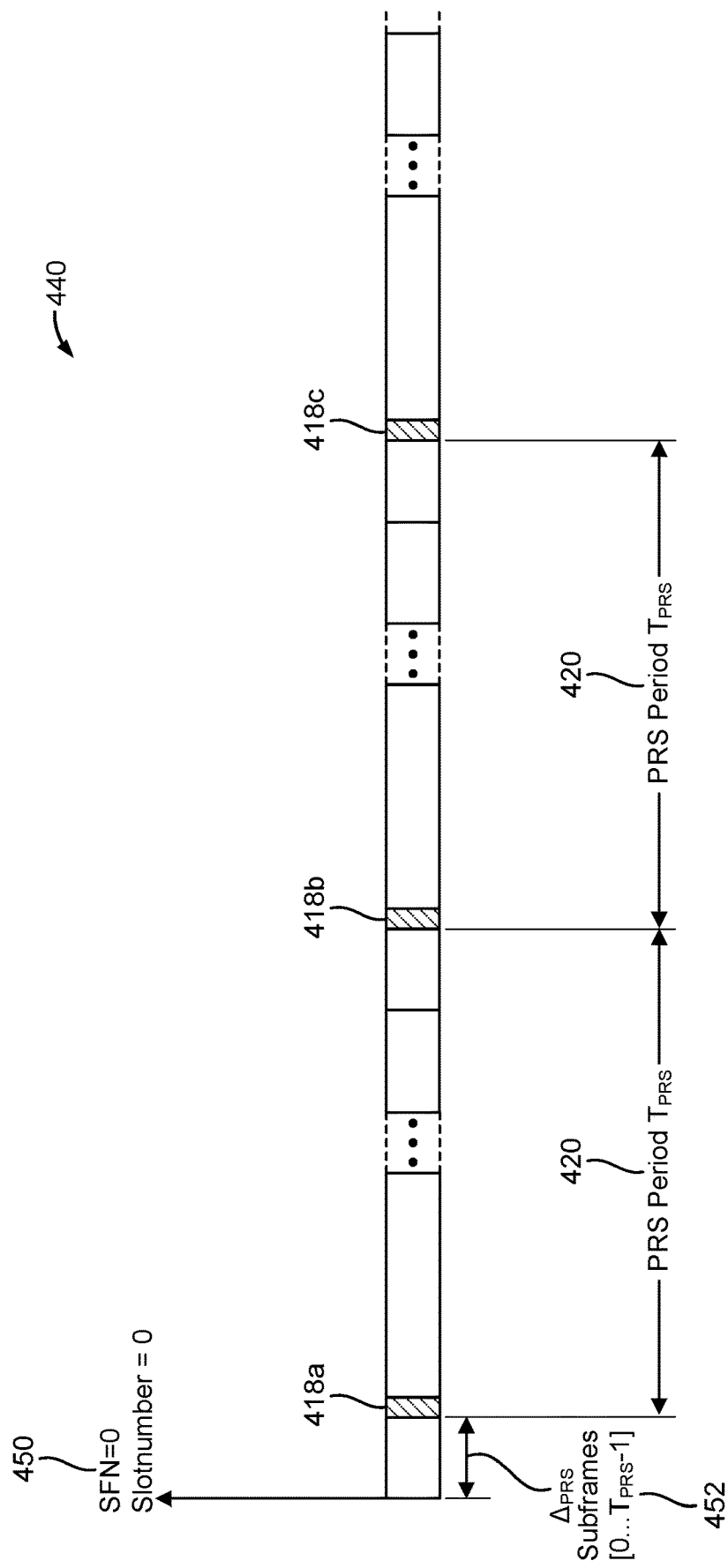
FIG. 4C illustrates an exemplary PRS configuration for a cell supported by a wireless node.

FIG. 4C illustrates an exemplary PRS configuration 440 for a cell supported by a wireless node (such as any of the base stations described herein). Again, PRS transmission for LTE is assumed in FIG. 4C, although the same or similar aspects of PRS transmission to those shown in and described for FIG. 4C may apply to NR and/or other wireless technologies. FIG. 4C shows how PRS positioning occasions are determined by a system frame number (SFN), a cell specific subframe offset ($\Delta_{PRS}$) 452, and the PRS periodicity ($T_{PRS}$) 420. Typically, the cell specific PRS subframe configuration is defined by a "PRS Configuration Index" $I_{PRS}$ included in observed time difference of arrival (OTDOA) assistance data. The PRS periodicity ($T_{PRS}$) 420 and the cell specific subframe offset ($\Delta_{PRS}$) are defined based on the PRS configuration index $I_{PRS}$, as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS} - 160$ |
| 480-1119 | 640 | $I_{PRS} - 480$ |
| 1120-2399 | 1280 | $I_{PRS} - 1120$ |
| 2400-2404 | 5 | $I_{PRS} - 2400$ |
| 2405-2414 | 10 | $I_{PRS} - 2405$ |
| 2415-2434 | 20 | $I_{PRS} - 2415$ |
| 2435-2474 | 40 | $I_{PRS} - 2435$ |
| 2475-2554 | 80 | $I_{PRS} - 2475$ |
| 2555-4095 | Reserved | |

A PRS configuration is defined with reference to the system frame number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 420, and APRs is the cell-specific subframe offset 452.

As shown in FIG. 4C, the cell specific subframe offset APRs 452 may be defined in terms of the number of subframes transmitted starting from system frame number 0 (Slot 'Number 0', marked as slot 450) to the start of the first (subsequent) PRS positioning occasion. In the example in FIG. 4C, the number of consecutive positioning subframes ($N_{PRS}$) in each of the consecutive PRS positioning occasions 418a, 418b, and 418c equals 4. That is, each shaded block representing PRS positioning occasions 418a, 418b, and 418c represents four subframes.

In some aspects, when a UE receives a PRS configuration index $I_{PRS}$ in the OTDOA assistance data for a particular cell, the UE may determine the PRS periodicity $T_{PRS}$ 420 and PRS subframe offset $\Delta_{PRS}$ using Table 2. The UE may then determine the radio frame, subframe and slot when a PRS is scheduled in the cell (e.g., using equation (1)). The OTDOA assistance data may be determined by, for example, the location server 172, and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset 452) relative to other cells in the network that use a different frequency. In SFN-synchronous networks all wireless nodes (e.g., base stations 102) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE may determine the timing of the PRS occasions of the reference and neighbor cells for OTDOA positioning, if the UE 104 can obtain the cell timing (e.g., SFN) of at least one of the cells, e.g., the reference cell or a serving cell. The timing of the other cells may then be derived by the UE 104 based, for example, on the assumption that PRS occasions from different cells overlap.

For LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the NPRS value can be increased to six (i.e., $N_{PRS}=6$) and the bandwidth (BW) value can be increased to the system bandwidth (i.e., BW=LTE system bandwidth in the case of LTE). An expanded PRS with a larger NPRS (e.g., greater than six) and/or a shorter $T_{PRS}$ (e.g., less than 160 ms), up to the full duty cycle (i.e., $N_{PRS}=T_{PRS}$), may also be used in later versions of the LTE positioning protocol (LPP). A directional PRS may be configured as just described and may, for example, use a low PRS duty cycle (e.g., $N_{PRS}=1$, $T_{PRS}=160$ subframes) or a high duty cycle.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using LPP) to a UE using bit strings. For example, in a bit string signaled to indicate a muting pattern, if a bit at position j is set to '0', then the UE may infer that the PRS is muted for $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE and NR systems. However, as used herein, unless otherwise indicated, the terms "positioning reference signal" and "PRS" refer to any type of reference signal that can be used for positioning, such as but not limited to, PRS signals in LTE and NR, navigation reference signals (NRS), tracking reference signals (TRS), cell-specific reference signals (CRS), CSI-RS, PSS, SSS, DMRS, sounding reference signals (SRS), etc.

Even when there is no traffic being transmitted from the network to a UE, the UE is expected to monitor every downlink subframe on the PDCCH. This means that the UE has to be "on," or active, all the time, even when there is no traffic, since the UE does not know exactly when the network will transmit data for it. However, being active all the time is a significant power drain for a UE.

To address this issue, a UE may implement discontinuous reception (DRX) and/or connected-mode discontinuous reception (CDRX) techniques. DRX and CDRX are mechanisms in which a UE goes into a "sleep" mode for a certain periods of time and "wakes up" for other periods of time. During the wake, or active, periods, the UE checks to see if there is any data coming from the network, and if there is not, goes back into sleep mode.

To implement DRX and CDRX, the UE and the network need to be synchronized. In a worst case scenario, the network may attempt to send some data to the UE while the UE is in sleep mode, and the UE may wake up when there is no data to be received. To prevent such scenarios, the UE and the network should have a well-defined agreement about when the UE can be in sleep mode and when the UE should be awake/active. This agreement is defined in, for example, 3GPP Technical Specification (TS) 36.321 for UEs in connected mode (CDRX), and 3GPP TS 36.304 for UEs in idle mode (DRX). Both of these documents are publicly available and are incorporated by reference herein in their entirety. Note that DRX includes CDRX, and thus, references to DRX refer to both DRX and CDRX, unless otherwise indicated.

The network (e.g., serving cell) can configure the UE with the DRX/CDRX timing using an RRC Connection Reconfiguration message (for CDRX) or an RRC Connection Setup message (for DRX). The network can signal the following DRX configuration parameters to the UE:

TABLE 3

| DRX Parameter | Description |
| --- | --- |
| DRX Cycle | The duration of one 'ON time' plus one 'OFF time'. (This value is not explicitly specified in RRC messages. This is calculated by the subframe/slot time and "long DRX cycle start offset") |
| ON Duration Timer | The duration of 'ON time' within one DRX cycle |

TABLE 3-continued

| DRX Parameter | Description |
| --- | --- |
| DRX Inactivity Timer | How long a UE should remain 'ON' after the reception of a PDCCH. When this timer is on, the UE remains in the 'ON state,' which may extend the ON period into the period that would be the 'OFF' period otherwise. |
| DRX Retransmission Timer | The maximum number of consecutive PDCCH subframes/slots a UE should remain active to wait for an incoming retransmission after the first available retransmission time. |
| Short DRX Cycle | A DRX cycle that can be implemented within the 'OFF' period of a long DRX cycle. |
| DRX Short Cycle Timer | The consecutive number of subframes/slots that should follow the short DRX cycle after the DRX inactivity timer has expired. |

Figure 5A:
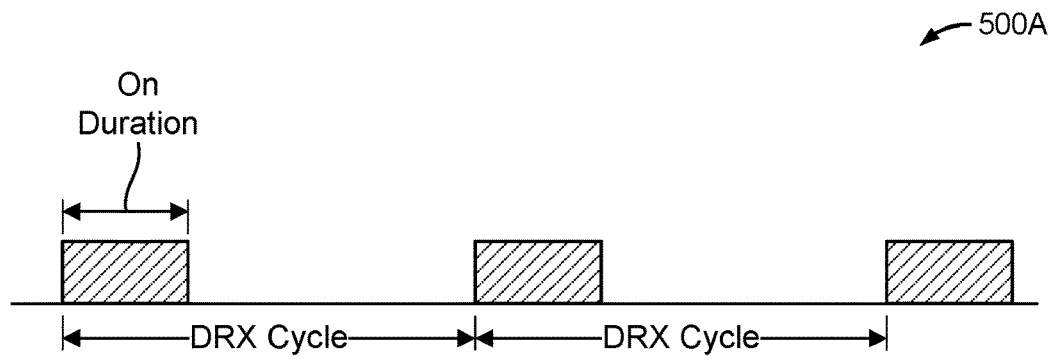
FIGS. 5A to 5C illustrate exemplary DRX configurations, according to aspects of the disclosure.
Figure 5B:
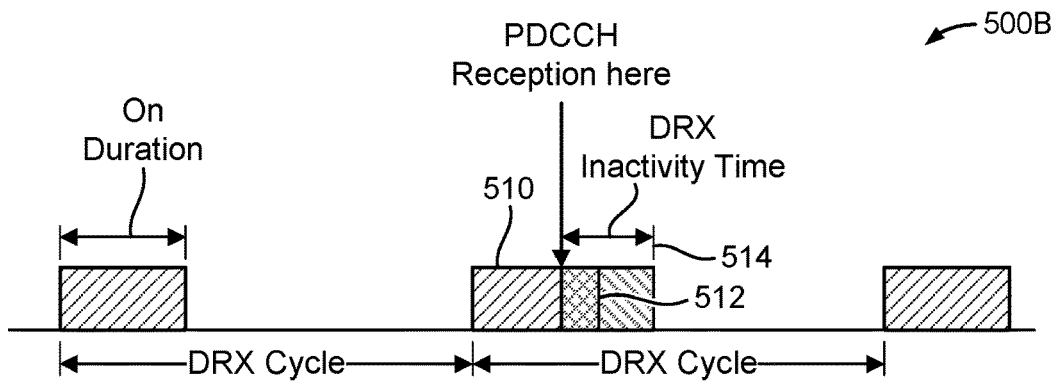
Figure 5C:
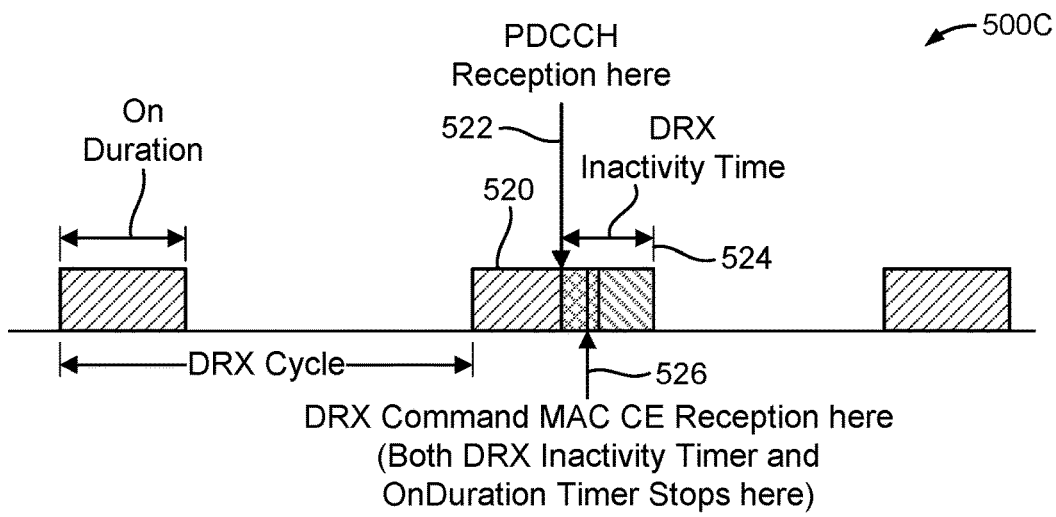

FIGS. 5A to 5C illustrate exemplary DRX configurations, according to aspects of the disclosure. FIG. 5A illustrates an exemplary DRX configuration 500A in which a long DRX cycle (the time from the start of one ON duration to the start of the next ON duration) is configured and no PDCCH is received during the cycle. FIG. 5B illustrates an exemplary DRX configuration 500B in which a long DRX cycle is configured and a PDCCH is received during an ON duration 510 of the second DRX cycle illustrated. Note that the ON duration 510 ends at time 512. However, the time that the UE is awake/active (the "active time") is extended to time 514 based on the length of the DRX inactivity timer and the time at which the PDCCH is received. Specifically, when the PDDCH is received, the UE starts the DRX inactivity timer and stays in the active state until the expiration of that timer (which is reset each time a PDDCH is received during the active time).

FIG. 5C illustrates an exemplary DRX configuration 500C in which a long DRX cycle is configured and a PDCCH and a DRX command MAC control element (CE) are received during an ON duration 520 of the second DRX cycle illustrated. Note that the active time beginning during ON duration 520 would normally end at time 524 due to the reception of the PDCCH at time 522 and the subsequent expiration of the DRX inactivity timer at time 524, as discussed above with reference to FIG. 5B. However, in the example of FIG. 5C, the active time is shortened to time 526 based on the time at which the DRX command MAC CE, which instructs the UE to terminate the DRX inactivity timer and the ON duration timer, is received.

In greater detail, the active time of a DRX cycle is the time during which the UE is considered to be monitoring the PDCCH. The active time may include the time during which the ON duration timer is running, the DRC inactivity timer is running, the DRX retransmission timer is running, the MAC contention resolution timer is running, a scheduling request has been sent on the physical uplink control channel (PUCCH) and is pending, an uplink grant for a pending HARQ retransmission can occur and there is data in the corresponding HARQ buffer, or a PDCCH indicating a new transmission addressed to the cell radio network temporary identifier (C-RNTI) of the UE has not been received after successful reception of a random access response (RAR) for the preamble not selected by the UE. And, in the non-contention based random access (RA), after receiving the RAR, the UE should be in an active state until the PDCCH indicating new transmission addressed to the C-RNTI of the UE is received.

Referring now to accuracy criteria for positioning a UE, regulatory standards are considered as a minimum performance target for NR positioning studies. For regulatory use cases, the following standards are considered as minimum performance targets for NR positioning: (1) horizontal positioning error less than or equal to 50 meters (m) for 80% of UEs, (2) vertical positioning error less than 5 m for 80% of UEs (sufficient for floor level vertical accuracy), and (3) end to end latency and time-to-first-fix (TTFF) of less than 30 seconds.

Additional positioning criteria based on commercial use cases can be used as input performance targets that are subject to further analysis in terms of performance/complexity tradeoffs in different evaluation scenarios. As a starting point for commercial use cases, the following criteria may be considered as performance targets for RAT-dependent solutions, and may be subject to further analysis in terms of performance/complexity tradeoffs for NR positioning radio-layer solutions: (1) horizontal positioning error less than 3 m for 80% of UEs in indoor deployment scenarios, (2) vertical positioning error less than 3 m for 80% of UEs in indoor deployment scenarios, (3) horizontal positioning error less than 10 m for 80% of UEs in outdoor deployments scenarios, (4) vertical positioning error less than 3 m for 80% of UEs in outdoor deployment scenarios, and (5) end to end latency of less than one second.

Note that the criteria listed above do not eliminate more or less demanding commercial use cases. In addition, an "indoor deployment" means that the UEs and base stations are deployed in an indoor environment. Similarly, an "outdoor deployment" means that the UEs and base stations are deployed in an outdoor environment. Further, it should be understood that no single positioning technology is required to meet all of the above criteria for every scenario.

Referring now to the interaction of reference signals (e.g., PRS) and DRX, there are various considerations. For NR, when it comes to CSI-RS for mobility, if the UE is configured with a DRX cycle, the UE is not expected to perform measurements of CSI-RS resources other than during the active time for measurements based on the parameter "CSI-RS-Resource-Mobility." If the UE is configured with a DRX cycle, and the DRX cycle in use is larger than 80 ms (considered a very large DRX cycle), the UE may not expect that CSI-RS resources are available other than during the active time for measurements based on CSI-RS-Resource-Mobility. Otherwise, the UE may assume CSI-RS are available for measurements based on CSI-RS-Resource-Mobility.

For NR, regarding CSI acquisition and feedback, when DRX is configured, the UE provides a CSI report only if it is receiving at least one CSI-RS transmission occasion for channel measurement and CSI-RS and/or CSI interference measurement (CSI-IM) occasion for interference measurement in the DRX active time no later than a CSI reference resource, and drops (does not send) the report otherwise. If the UE is configured with a DRX cycle, the most recent CSI measurement occasion occurs in the DRX active time for CSI to be reported.

In contrast, for LTE, regarding PRS reception, all intra-frequency RSTD measurement criteria should apply without DRX as well as for any DRX and eDRX_CONN cycles specified in 3GPP TS 36.331 (which is publicly available and is incorporated herein by reference in its entirety). That is, the UE is expected to wake up and measure PRS outside the active DRX period if necessary. Any DRX may be configured at the UE when an LPP request arrives (LPP is not decodable by the base station), and the UE is expected to fulfil the criteria. To fulfil them, the UE may need to measure outside the active DRX, that is, when otherwise in an inactive, or sleep, mode. Otherwise, there may be a risk that PRS occasions always fall in DRX inactive periods.

As will be appreciated, using an NR CSI-RS reception scheme for PRS reception when operating in DRX mode could result in too few PRS measurements, and therefore, insufficient positioning accuracy. Using the LTE PRS reception scheme, however, would result in unnecessary power consumption. As such, there is a need for improved techniques for PRS reception while operating in DRX mode.

Accordingly, in the present disclosure, the serving base station and/or the UE can inform the location server (e.g., location server 230, LMF 270) of the assigned DRX configuration. The serving base station can inform the location server using NR positioning protocol type A (NRPPa), and/or the UE can inform the location serving using LPP (or the corresponding NR protocol). The assigned DRX configuration would be communicated to the location server in a new information element (IE) that would include the parameters in Table 3. This IE may have the same format as the DRX-Configuration IE for RRC. The location server can then attempt to align the scheduled PRS resources with the UE's DRX active time so that positioning performance is not affected and low power consumption is achieved. In an aspect, whether or not the base station and/or the UE inform the location server of the DRX configuration may depend on whether or not the location server is part of the RAN (in some implementations, the location server is outside of the RAN and cannot communicate with components of the RAN). For example, for a location server that is not part of the RAN, this feature may not be supported, and vice versa.

If the location server is made aware of the DRX configuration, it can configure the UE according to various options. As a first option, the location server can configure the UE to measure PRS resources independent of the DRX configuration, or to meet the positioning performance request independent of the DRX configuration. In this case, as in LTE, the UE will wake up outside of the active DRX period as necessary to measure PRS resources to meet the requested positioning performance. As a second option, the location server can configure the UE to measure a selection of the PRS resources according to the DRX configuration (and up to UE implementation), or to meet a different set of, perhaps more relaxed, positioning performance criteria based on the amount of overlap of the DRX active times with the PRS resources.

In an aspect, the location server may configure the UE to measure PRS independently of, or based on, the DRX configuration with a 1-bit field in the PRS-Information message of the LPP protocol. Another option is without an explicit configuration. If the UE sends the DRX configuration to the location server, then the understanding may be that the UE will measure a selection of PRS resources according to the signaled DRX configuration and associated performance requirements. If the base station informs the location server of the DRX configuration, then a field can be added in the PRS-Information message in LPP that allows the location server to inform the UE that the DRX configuration is known at the location server.

There may also be the same considerations for uplink reference signal (e.g., SRS) transmissions when DRX is configured. That is, the location server may configure the UE to transmit the uplink reference signals regardless of the DRX configuration, or to transmit the uplink reference signals with as much overlap with the DRX active times as is practicable. The location server can configure the UE using LPP.

If the location server is part of the RAN, it can configure the serving and neighboring base stations/cells of the UE to transmit their PRS occasions based on the UE's DRX configuration (a single UE for unicast PRS, or a group of UEs for multicast/broadcast PRS). In an aspect, this may be accomplished over additional NRPPa signaling between the location server and the base station(s).

Figure 6:
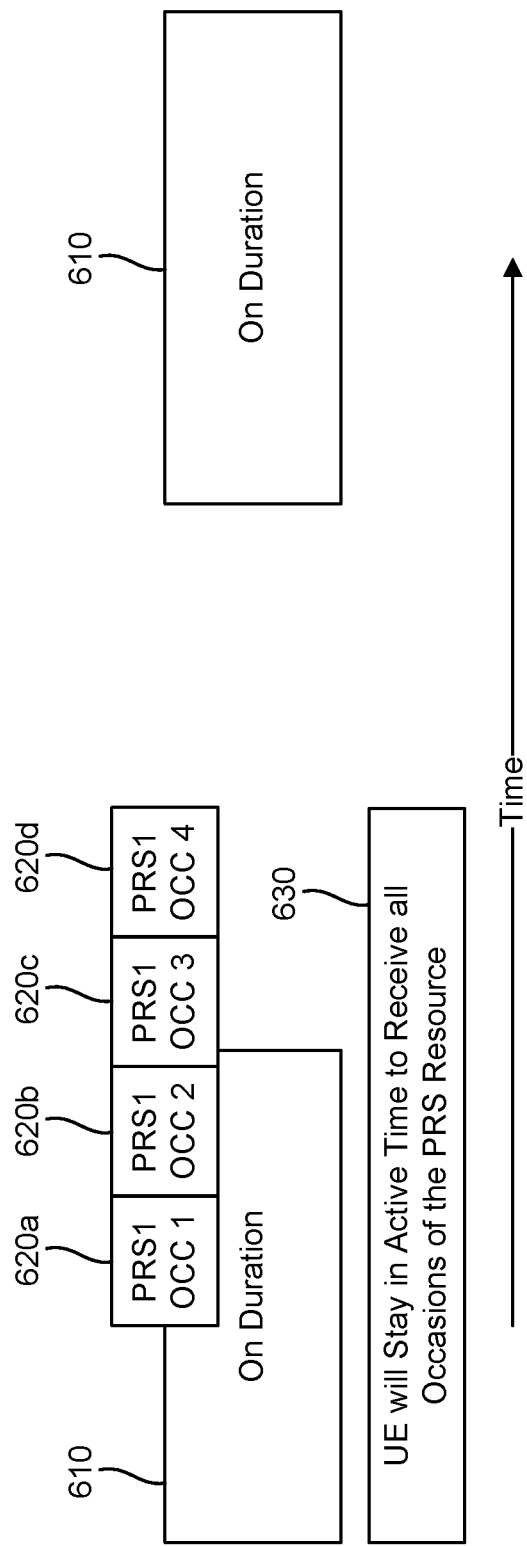
FIGS. 6 to 10 illustrate examples of how a UE can handle an overlap between PRS occasions and DRX active time, according to aspects of the disclosure.

A UE can handle an "overlap" between the occurrence of PRS resources and DRX active time in different ways. As a first option, if at least one PRS occasion of a given PRS resource is received within an ON duration (or within the active time) of the UE's DRX cycle, then the UE may be expected to receive the subsequent consecutive PRS occasions of that PRS resource that occur after the ON duration/active time. This is illustrated in FIG. 6. As shown in FIG. 6, an ON duration 610 of a UE's DRX cycle overlaps with the first two consecutive PRS occasions 620a and 620b ("OCC1" and "OCC2") of a given PRS resource ("PRS1"). As such, the UE is expected to remain active to receive the remaining consecutive PRS occasions 620c and 620d ("OCC3" and "OCC4") of the PRS resource (illustrated as active period 630). It can then go back to sleep until the next ON duration 610.

Note that in the example of FIG. 6, no PDCCH is received during the ON duration 610, and therefore, the UE remains active only long enough to receive the remaining PRS occasions 620c and 620d. Further, as discussed above with reference to FIG. 4C, groups of consecutive PRS occasions of a PRS resource may occur periodically (e.g., $T_{PRS}$ 420). The UE is not expected to stay awake to receive every periodically occurring group of consecutive PRS occasions of the PRS resource, but rather, only the instance(s) (occasions 620a-d in the example of FIG. 6) of the periodically occurring groups of consecutive PRS occasions of the PRS resource that overlap with an ON duration.

Figure 7:
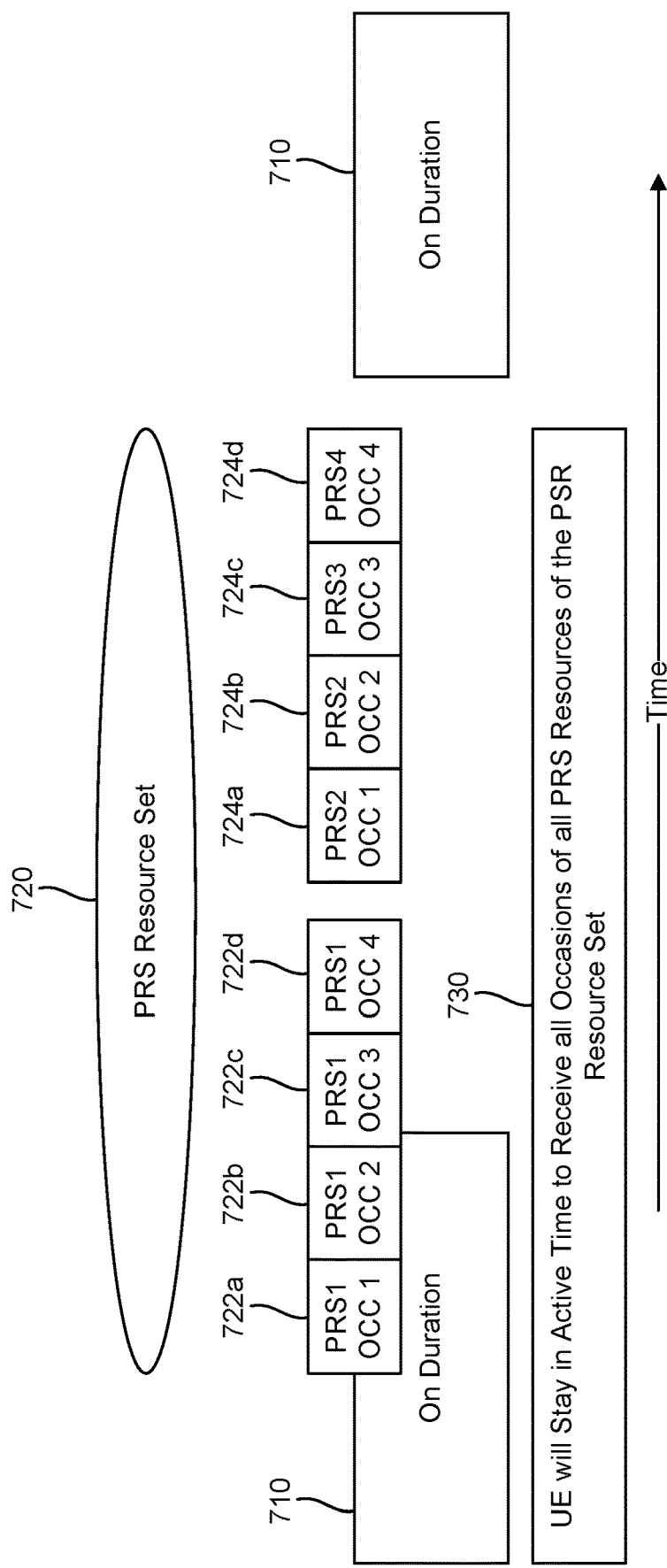

As a second option, if at least one occasion of a PRS resource of a PRS resource set is received within an ON duration (or within the active time) of the UE's DRX cycle, then the UE is expected to receive all PRS occasions of all PRS resources of the PRS resource set that occur after the ON duration/active time. This is illustrated in FIG. 7. In the example of FIG. 7, a PRS resource set 720 includes a first group of four consecutive PRS occasions 722a-d ("OCC1" to "OCC4") of a first PRS resource ("PRS1") and a second group of four consecutive PRS occasions 724a-d ("OCC1" to "OCC4") of a second, third, and fourth PRS resource ("PRS2," "PRS3," and "PRS4"). In an aspect, each of the different PRS resources (e.g., PRS1 to PRS4) may be transmitted on different downlink transmit beams.

In FIG. 7, an ON duration 710 of a UE's DRX cycle overlaps with the first two consecutive PRS occasions 722a and 722b of the first PRS resource ("PRS1") of the PRS resource set 720. As such, the UE is expected to remain active to receive the remaining PRS occasions of the PRS resources of the PRS resource set 720, i.e., occasions 722c and 722d of the first PRS resource, occasions 724a and 724b of the second PRS resource, occasion 724c of the third PRS resource, and occasion 724d of the fourth PRS resource (illustrated as active period 730). It can then go back to sleep until the next ON duration 710.

Note that in the example of FIG. 7, no PDCCH is received during the ON duration 710, and therefore, the UE remains active only long enough to receive the remaining PRS occasions (occasions 722c to 724d) of the PRS resource set 720. Further, PRS resource sets may be transmitted periodically. The UE is not expected to stay awake to receive every periodically occurring instance of the PRS resource set, but rather, only the instance (occasions 722a to 724d in the example of FIG. 7) that overlaps with an ON duration.

Figure 8:
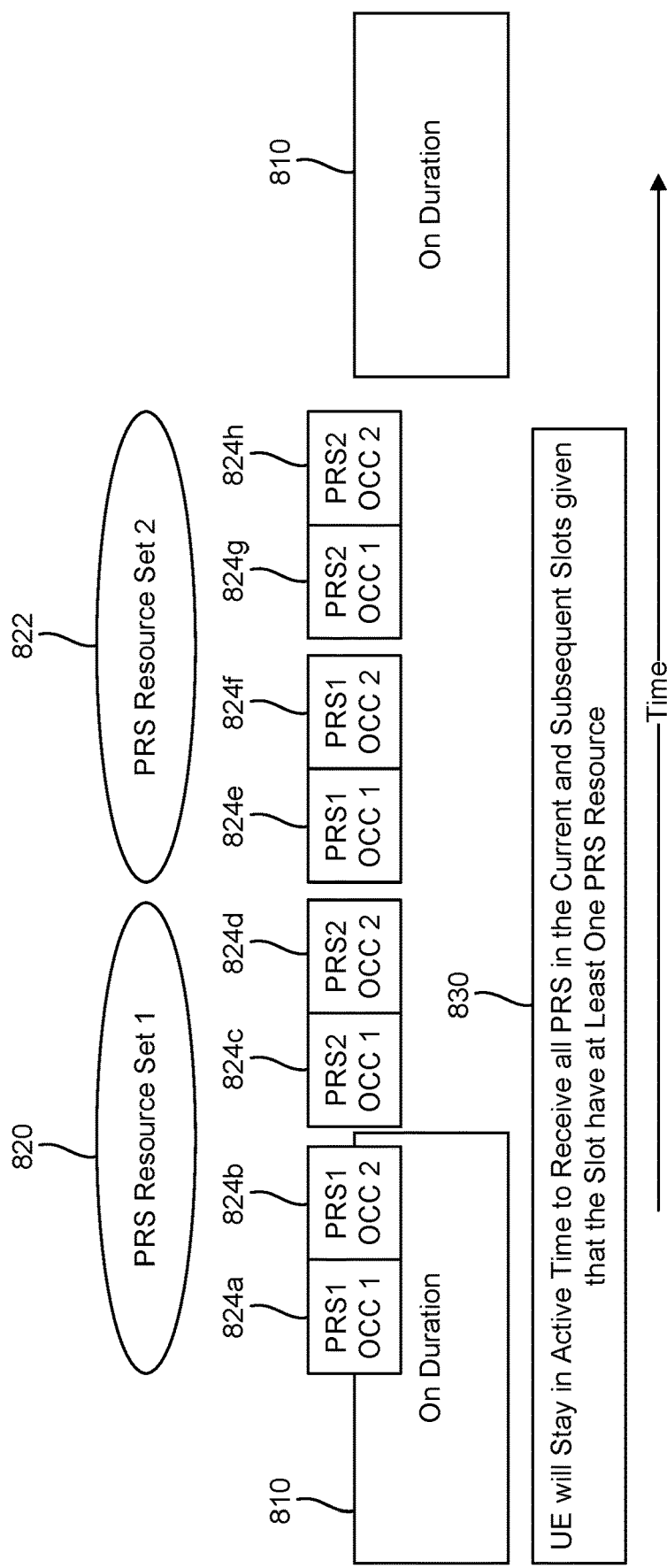

As a third option for how the UE can handle an overlap between PRS and DRX active time, if at least one occasion of a PRS resource is received within an ON duration (or within the active time) of the UE's DRX cycle, then the UE is expected to receive all PRS resources inside the current slot and any subsequent slots that contain PRS resources up to a slot for which no PRS resource is configured to be received. This is illustrated in FIG. 8. In the example of FIG. 8, a first PRS resource set 820 includes a first group of four consecutive PRS occasions 824a-d and a second PRS resource set 822 includes a second group of four consecutive PRS occasions 824e-h. The first two occasions of each PRS resource set (i.e., occasions 824a, 824b, 824e, 824f) belong to a first PRS resource ("PRS1"), and the second two occasions of each PRS resource set (i.e., occasions 824c, 824d, 824g, 824h) belong to a second PRS resource ("PRS2"). Each occasion 824 may correspond to a slot (e.g., slot 414). In an aspect, each of the different PRS resources may be transmitted on different downlink transmit beams.

In FIG. 8, an ON duration 810 of a UE's DRX cycle overlaps with the first two consecutive PRS occasions 824a and 824b of the first PRS resource ("PRS1") of the PRS resource set 820. As such, the UE is expected to remain active to receive all PRS resources in the current and subsequent occasions (here, slots) that contain PRS resources up to an occasion (slot) for which no PRS resource is configured to be received by the UE (illustrated as active period 830). In the example of FIG. 8, the subsequent occasions are occasions 824c-h, which, in contrast to FIG. 7, belong to two different PRS resource sets instead of the same PRS resource set as in FIG. 7.

Note that for the options described above, there may be two modes. First, the additional time that the UE remains active to receive PRS (beyond the usual DRX ON duration) can be counted as DRX active time, in which case the UE can receive other downlink transmissions, such as the PDCCH or PDSCH. Alternatively, the additional time would not be counted as active time, in which case, the UE would only process PRS, and would not monitor for the PDCCH. As used herein, the term "active period" encompasses both options, and therefore, an active period may be commensurate with DRX active time, or may be the DRX active time plus any additional time during which the UE is active only for the purpose of processing PRS.

Figure 9:
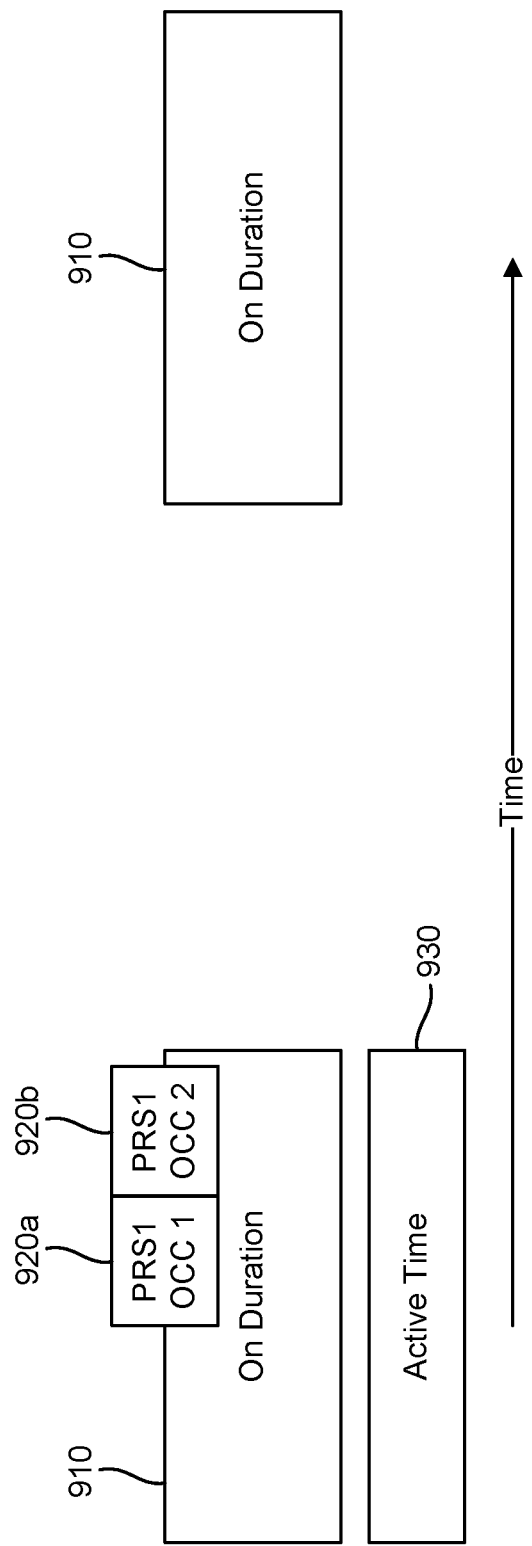

As a fourth option for how the UE can handle an overlap between PRS and DRX active time, the UE may only be expected to process the PRS occasions that are fully inside an ON duration (or an active duration) of the UE's DRX cycle, similar to CSI-RS for mobility. This is illustrated in FIG. 9. As shown in FIG. 9, an ON duration 910 of a UE's DRX cycle overlaps with the first two consecutive PRS occasions 920a and 920b ("OCC1" and "OCC2") of a given PRS resource ("PRS1"). The UE is only expected to process the PRS occasions (occasions 920a and 920b) that are fully inside the ON duration 910 (illustrated as active period 930). It can then go back to sleep until the next ON duration 910.

In the fourth option, when the UE's DRX configuration affects the UE's processing of PRS resources (e.g., the UE cannot measure as many PRS occasions as needed for a requested positioning accuracy), the positioning performance criteria can be adjusted to ensure that a minimum number of PRS occasions are being received. For example, since the UE is likely not able to process all PRS occasions due to its DRX configuration, the location server expects a reduced positioning performance to better align with the number of PRS occasions the UE will be able to measure during its ON durations.

Any of the options described above with reference to FIGS. 6 to 9 can also be conditioned on the length of time that the UE would be expected to measure (i.e., be in active time). For example, if, due to the options described above, the UE would be expected to stay active much longer than its configured ON duration or DRX inactivity timer (e.g., longer than some threshold), then the UE would not be expected to measure these PRS resources. Instead, the UE may be configured to extend its active time only up to some threshold.

The same considerations would also apply to uplink reference signal (e.g., SRS) transmissions when DRX is configured. For example, if the UE is configured to transmit SRS, but not all SRS occasions overlap with DRX ON durations, then the UE may only transmit the SRS that overlap with the ON durations according to the options described above with reference to downlink reception. That is, the UE may transmit some additional number of SRS beyond the ON duration, similar to the reception of additional PRS occasions in the first, second, and third options described above.

As a fifth option for how the UE can handle an overlap between PRS and DRX active time, for round-trip-time (RTT) positioning, two reference signal transmissions are needed. For a downlink RTT procedure (initiated by the base station), the base station sends a downlink reference signal (e.g., PRS) to the UE and receives an uplink reference signal (e.g., SRS) from the UE in response. The response from the UE may include the UE reception-to-transmission measurement ($UE_{Rx-Tx}$), i.e., the time from when the UE receives the downlink reference signal to the time it transmits the uplink reference signal. Based on the transmission time of the downlink reference signal and the reception time of the uplink reference signal (i.e., the base station's transmission-to-reception measurement ($BS_{Tx-Rx}$)) and the UE's reception-to-transmission measurement, the base station can determine the RTT between itself and the UE, and thereby the distance between itself and the UE.

An RTT positioning procedure can also be initiated on the uplink (e.g., by the UE). In that case, the UE sends an uplink reference signal (e.g., SRS) to the base station and receives a downlink reference signal (e.g., PRS) from the base station in response. The response from the base station may include the base station reception-to-transmission measurement ($BS_{Rx-Tx}$). Based on the transmission time of the uplink reference signal and the reception time of the downlink reference signal (i.e., the UE's transmission-to-reception measurement ($UE_{Tx-Rx}$)) and the base station's reception-to-transmission measurement, the UE (or the location server) can determine the RTT between itself and the base station, and thereby the distance between itself and the base station.

Figure 10:
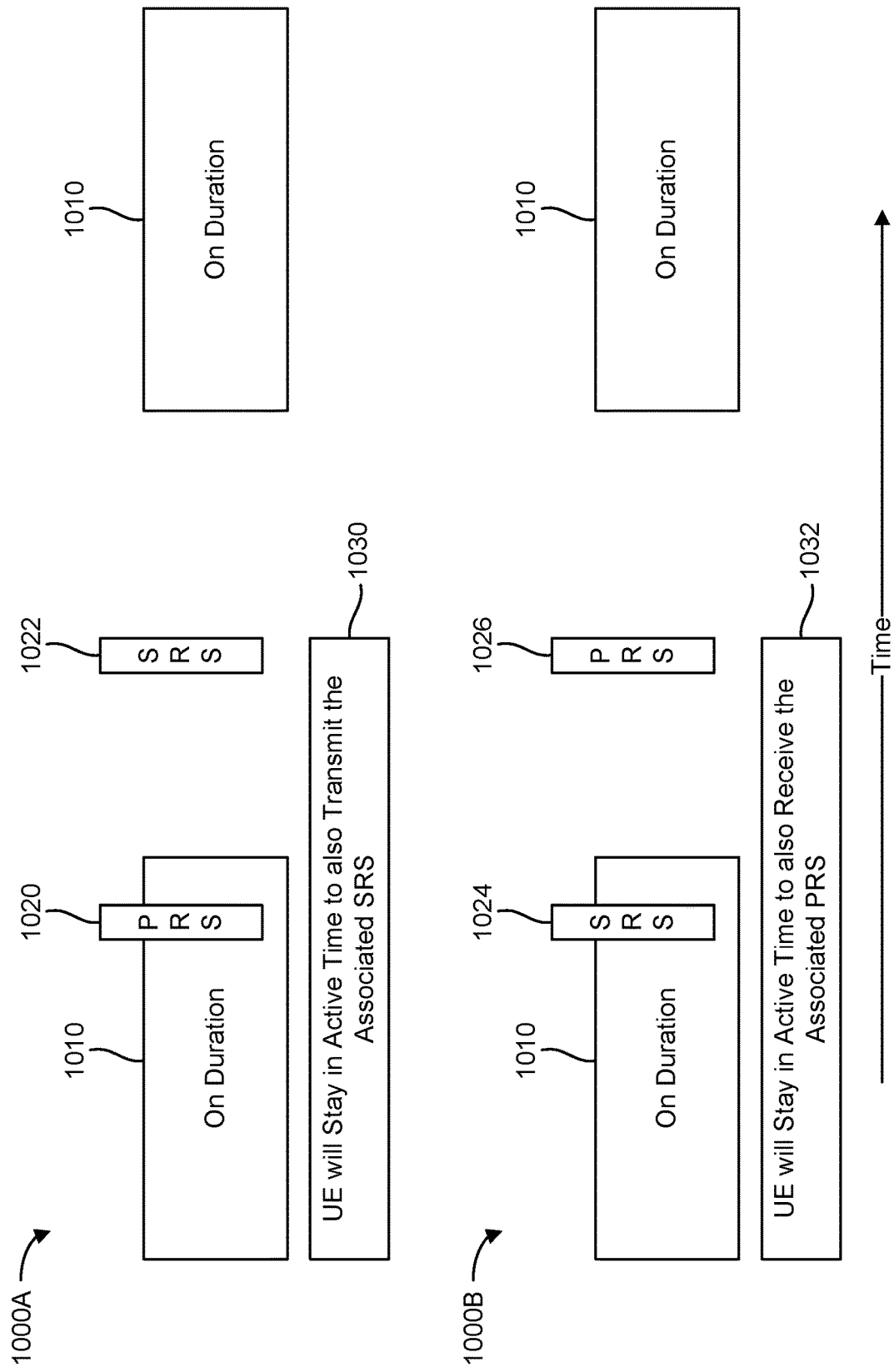

In either of these cases, when the UE is configured for DRX, if reception of a downlink PRS (for base station-initiated RTT) or transmission of an SRS (for UE-initiated RTT) falls within a DRX active time, then the UE is expected to stay in active time for the reception/transmission of the other associated downlink/uplink reference signal. This is illustrated in FIG. 10. As shown in FIG. 10, in a first example 1000A, an ON duration 1010 of a UE's DRX cycle overlaps with a PRS 1020 of a downlink RTT positioning procedure. As such, the UE is expected to stay in active time for the transmission of the associated SRS 1022 (illustrated as time period 1030). In a second example 1000B, an ON duration 1010 of a UE's DRX cycle overlaps with an SRS

1024 of an uplink RTT positioning procedure. As such, the UE is expected to stay in active time for the reception of the associated PRS 1026 (illustrated as time period 1032). The UE can then perform positioning measurements (e.g., ToA, angle of arrival (AoA)) of the received PRS 1026.

In an aspect, issues may arise as to whether PRS or data transmission/reception should be given higher priority due to the DRX configuration. Generally, DRX active time is designed for discontinuous reception of data while the UE is otherwise in some power saving mode, so it could be rather short in time, for example, 2 to 10 ms. If PRS are received when DRX is configured, there may be a collision of PRS with data on the same resources. In that case, the UE may be expected to prioritize the reception and processing of PRS. Otherwise, if DRX is not configured, the UE may prioritize the reception of data, or treat both of them with equal priority.

Figure 11:
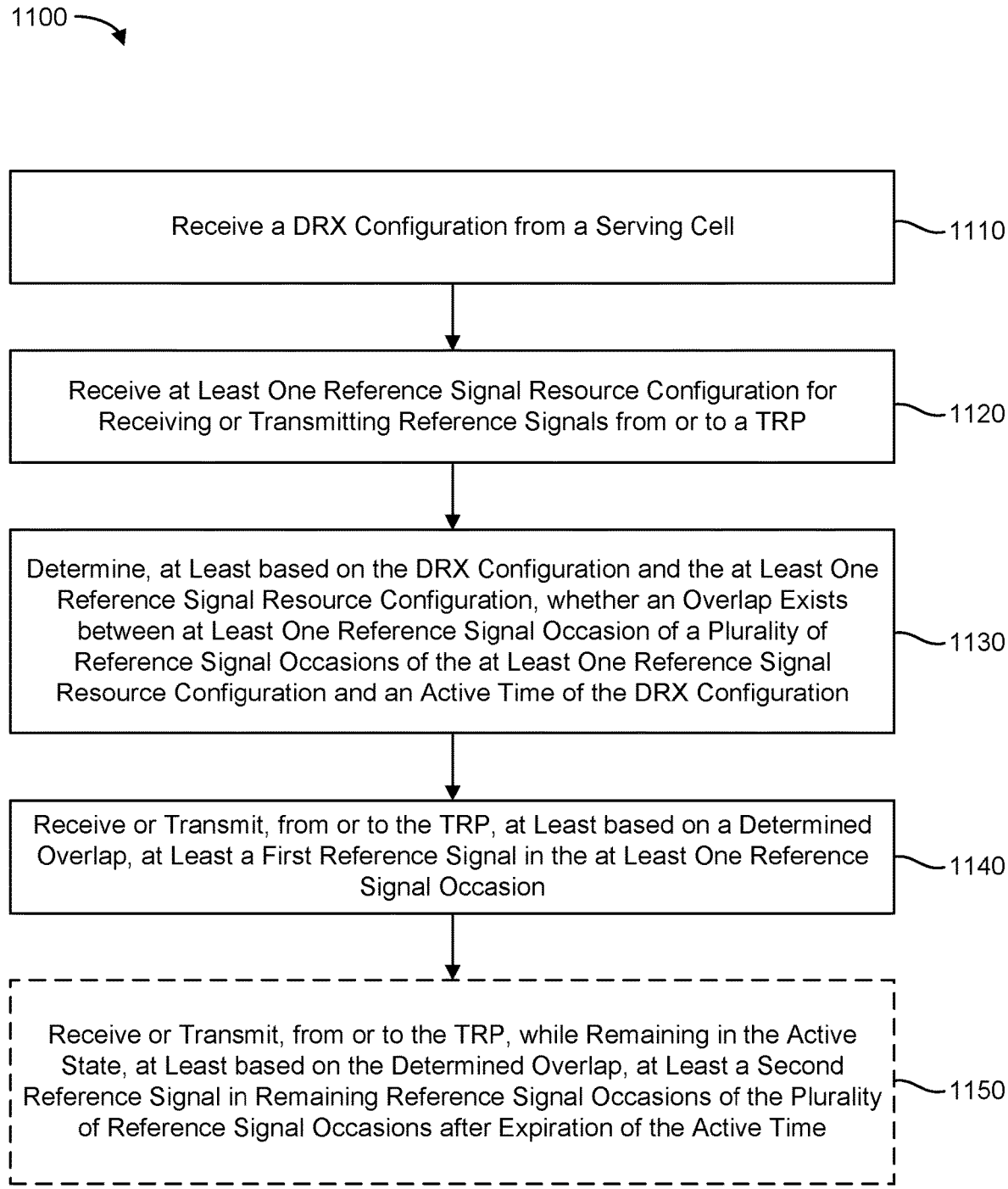
FIGS. 11 and 12 illustrate exemplary methods of wireless communication, according to aspects of the disclosure.

FIG. 11 illustrates an exemplary method 1100 of wireless communication, according to aspects of the disclosure. In an aspect, the method 1100 may be performed by a UE (e.g., any of the UEs described herein) operating in a DRX mode.

At 1110, the UE receives a DRX configuration from a serving cell. In an aspect, operation 1110 may be performed by the WWAN transceiver 310, the receiver(s) 312, the processing system 332, the memory component 340, and/or the PRS-DRX interaction manager 342, any or all of which may be considered as means for performing this operation.

At 1120, the UE receives at least one reference signal resource configuration for receiving or transmitting reference signals from or to a TRP. The UE may receive the reference signal resource configuration from a location server (e.g., location server 230 or LMF 270), or it may be encapsulated in messages received through a base station, or through one or more intermediaries, etc. In an aspect, operation 1120 may be performed by the WWAN transceiver 310, the receiver(s) 312, the processing system 332, the memory component 340, and/or the PRS-DRX interaction manager 342, any or all of which may be considered as means for performing this operation.

At 1130, the UE determines, at least based on the DRX configuration and the at least one reference signal resource configuration, whether an overlap exists between at least one reference signal occasion of a plurality of reference signal occasions of the at least one reference signal resource configuration and an active time of the DRX configuration. In an aspect, the plurality of reference signal occasions comprises a plurality of consecutive slots in which the at least one reference signal resource configuration is scheduled. In an aspect, operation 1130 may be performed by the WWAN transceiver 310, the processing system 332, the memory component 340, and/or the PRS-DRX interaction manager 342, any or all of which may be considered as means for performing this operation.

At 1140, the UE receives or transmits, from or to a TRP, at least based on a determined overlap (at 1130), at least a first reference signal (e.g., PRS if receiving or SRS if transmitting) in at least one reference signal occasion. In an aspect, operation 1140 may be performed by the WWAN transceiver 310, the receiver(s) 312, the transmitter(s) 314, the processing system 332, the memory component 340, and/or the PRS-DRX interaction manager 342, any or all of which may be considered as means for performing this operation.

At 1150, the UE optionally receives or transmits, from or to the TRP, while remaining in an active state of the DRX configuration, at least based on the determined overlap, at least a second reference signal (e.g., PRS if receiving or SRS if transmitting) in the remaining reference signal occasions of the plurality of reference signal occasions after expiration of the active time. The UE can then perform positioning based on the first and second reference signals while in DRX mode. In an aspect, operation 1150 may be performed by the WWAN transceiver 310, the receiver(s) 312, the transmitter(s) 314, the processing system 332, the memory component 340, and/or the PRS-DRX interaction manager 342, any or all of which may be considered as means for performing this operation.

Figure 12:
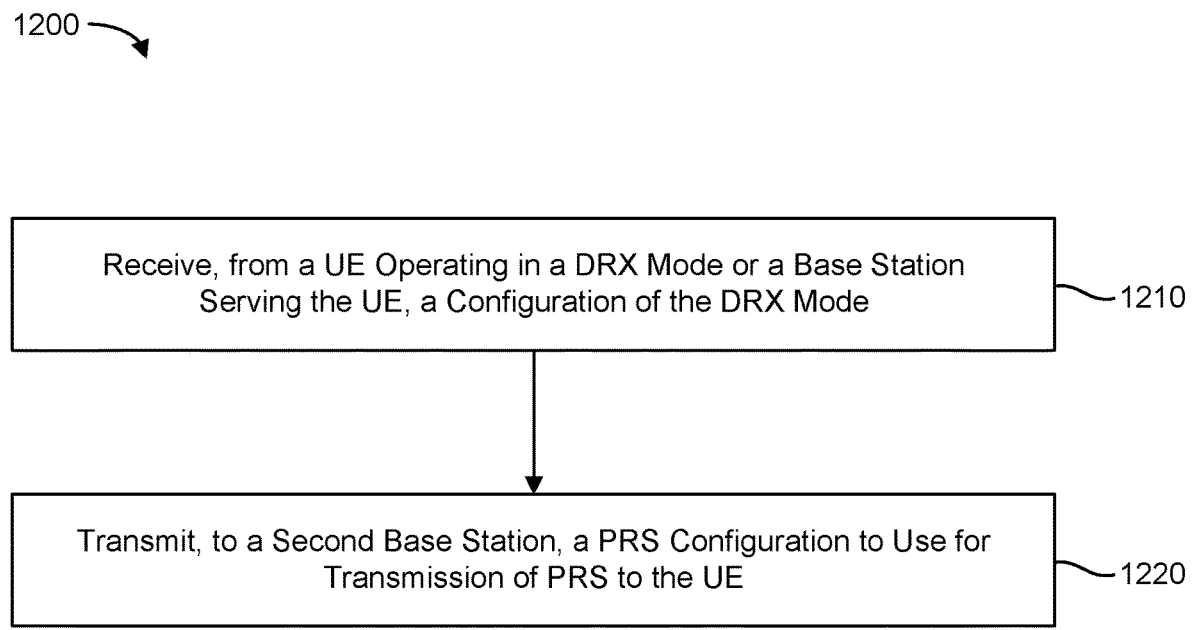

FIG. 12 illustrates an exemplary method 1200 of wireless communication, according to aspects of the disclosure. In an aspect, the method 1200 may be performed by a location server, such as location server 230 or LMF 270.

At 1210, the location server receives, from a UE (e.g., any of the UEs described herein) operating in a DRX mode or a base station (e.g., any of the base stations described herein) serving the UE, a configuration of the DRX mode. In an aspect, operation 1210 may be performed by the network interface(s) 390, the processing system 394, the memory component 396, and/or the PRS-DRX interaction manager 398, any or all of which may be considered as means for performing this operation.

At 1220, the location server transmits, to a second base station (e.g., either the serving base station or a neighboring base station), a PRS configuration to use for transmission of PRS to the UE. In an aspect, operation 1220 may be performed by the network interface(s) 390, the processing system 394, the memory component 396, and/or the PRS-DRX interaction manager 398, any or all of which may be considered as means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a location server, comprising:
receiving, from a user equipment (UE) operating in a discontinuous reception (DRX) mode or a base station serving the UE, a configuration of the DRX mode; and
transmitting, to a second base station, a positioning reference signal (PRS) configuration to use for transmission of PRS to the UE,
wherein the PRS configuration specifies, based on the configuration of the DRX mode of the UE, a plurality of PRS occasions of at least one PRS resource that at least partially overlaps an active state of the DRX mode.

2. The method of claim 1, further comprising configuring the plurality of PRS occasions based on maximizing an overlap with the active state of the DRX mode.

3. The method of claim 1, further comprising:
configuring the UE to measure the plurality of PRS occasions of the at least one PRS resource regardless of active or inactive states of the DRX mode.

4. The method of claim 1, further comprising:
configuring the UE to measure a portion of the plurality of PRS occasions of the at least one PRS resource that overlaps the active state of the DRX mode.

5. The method of claim 1, wherein the second base station is the base station serving the UE.

6. A location server, comprising:
a memory;
at least one network interface; and
at least one processor communicatively coupled to the memory and the at least one network interface, the at least one processor configured to:
receive, via the at least one network interface, from a user equipment (UE) operating in a discontinuous reception (DRX) mode or a base station serving the UE, a configuration of the DRX mode; and
cause the at least one network interface to transmit, to a second base station, a positioning reference signal (PRS) configuration to use for transmission of PRS to the UE,
wherein the PRS configuration specifies, based on the configuration of the DRX mode of the UE, a plurality of PRS occasions of at least one PRS resource that at least partially overlaps an active state of the DRX mode.

7. The location server of claim 6, wherein the at least one processor is further configured to:
configure the plurality of PRS occasions based on maximizing an overlap with the active state of the DRX mode.

8. The location server of claim 6, wherein the at least one processor is further configured to:
configure, via the at least one network interface, the UE to measure the plurality of PRS occasions of the at least one PRS resource regardless of active or inactive states of the DRX mode.

9. The location server of claim 6, wherein the at least one processor is further configured to:
configure, via the at least one network interface, the UE to measure a portion of the plurality of PRS occasions of the at least one PRS resource that overlaps the active state of the DRX mode.

10. The location server of claim 6, wherein the second base station is the base station serving the UE.

11. A location server, comprising:
means for receiving, from a user equipment (UE) operating in a discontinuous reception (DRX) mode or a base station serving the UE, a configuration of the DRX mode; and
means for transmitting, to a second base station, a positioning reference signal (PRS) configuration to use for transmission of PRS to the UE, wherein the PRS configuration specifies, based on the configuration of the DRX mode of the UE, a plurality of PRS occasions of at least one PRS resource that at least partially overlaps an active state of the DRX mode.

12. The location server of claim 11, further comprising means for configuring the plurality of PRS occasions based on maximizing an overlap with the active state of the DRX mode.

13. The location server of claim 11, further comprising:
   means for configuring the UE to measure the plurality of PRS occasions of the at least one PRS resource regardless of active or inactive states of the DRX mode.

14. The location server of claim 11, further comprising:
   means for configuring the UE to measure a portion of the plurality of PRS occasions of the at least one PRS resource that overlaps the active state of the DRX mode.

15. The location server of claim 11, wherein the second base station is the base station serving the UE.

16. A non-transitory computer-readable medium storing computer-executable instructions that, when executed by a location server, cause the location server to:
   receive, from a user equipment (UE) operating in a discontinuous reception (DRX) mode or a base station serving the UE, a configuration of the DRX mode; and
   transmit, to a second base station, a positioning reference signal (PRS) configuration to use for transmission of PRS to the UE,
   wherein the PRS configuration specifies, based on the configuration of the DRX mode of the UE, a plurality of PRS occasions of at least one PRS resource that at least partially overlaps an active state of the DRX mode.

17. The non-transitory computer-readable medium of claim 16, wherein the computer-executable instructions further comprise at least one instruction that, when executed by the location server, causes the location server to:
   configure the plurality of PRS occasions based on maximizing an overlap with the active state of the DRX mode.

18. The non-transitory computer-readable medium of claim 16, wherein the computer-executable instructions further comprise at least one instruction that, when executed by the location server, causes the location server to:
   configure the UE to measure the plurality of PRS occasions of the at least one PRS resource regardless of active or inactive states of the DRX mode.

19. The non-transitory computer-readable medium of claim 16, wherein the computer-executable instructions further comprise at least one instruction that, when executed by the location server, causes the location server to:
   configure the UE to measure a portion of the plurality of PRS occasions of the at least one PRS resource that overlaps the active state of the DRX mode.

20. The non-transitory computer-readable medium of claim 16, wherein the second base station is the base station serving the UE.

* * * * *